(12) United States Patent
Vuletic

(10) Patent No.: US 6,767,383 B1
(45) Date of Patent: Jul. 27, 2004

(54) METHOD FOR PRODUCING PIG IRON

(76) Inventor: Bogdan Vuletic, Saarwerdenstrasse 13, 40457 Duesseldorf (DE)

( * ) Notice: Subject to any disclaimer, the term of this patent is extended or adjusted under 35 U.S.C. 154(b) by 28 days.

(21) Appl. No.: 10/148,474
(22) PCT Filed: Nov. 28, 2000
(86) PCT No.: PCT/EP00/11870
§ 371 (c)(1),
(2), (4) Date: May 30, 2002
(87) PCT Pub. No.: WO01/48251
PCT Pub. Date: Jul. 5, 2001

(30) Foreign Application Priority Data

Dec. 23, 1999 (DE) .......................................... 199 63 609

(51) Int. Cl.⁷ .............................................. C21B 13/14
(52) U.S. Cl. ........................................................ 75/492
(58) Field of Search .......................................... 75/492

(56) References Cited

U.S. PATENT DOCUMENTS

| | | |
|---|---|---|
| 4,045,214 A | 8/1977 | Wetzel et al. |
| 4,946,498 A | 8/1990 | Weber |
| 6,395,052 B1 * | 5/2002 | Schrey et al. .............. 75/10.38 |
| 6,419,724 B1 * | 7/2002 | Monteyne .................. 75/47.6 |

FOREIGN PATENT DOCUMENTS

WO    WO 99 28512 A    6/1999

* cited by examiner

Primary Examiner—Melvyn Andrews
(74) Attorney, Agent, or Firm—Marshall & Melhorn, LLC

(57) ABSTRACT

The invention relates to a method for producing pig iron. Iron ore is reduced in a reduction shaft (1) for forming sponge iron which is subsequently introduced into the head of a melt-down gasifier (3). The sponge iron is melt open in said gasifier by means of a gasifying means that is also introduced into the head of the melt-down gasifier and an oxygen-containing gas and is melt-down to form liquid pig iron, whereby a reduction gas is produced at the same time. Said reduction gas is discharged from the head of the melt-down gasifier and is supplied to the reduction shaft for reducing the iron oxide. Operation of the melt-down gasifier is controlled in such a way that a reduction gas having a certain composition and being present in a certain amount is produced so that the sponge iron that is introduced into the melt-down gasifier is provided with a high metallisation degree. Operation of the melt-down gasifier is also controlled by introducing iron oxide therein. The metallisation degree of all the iron carriers which are introduced into the melt-down gasifier is reduced in relation to the metallisation degree of the sponge iron and by means of said iron oxide.

9 Claims, 1 Drawing Sheet

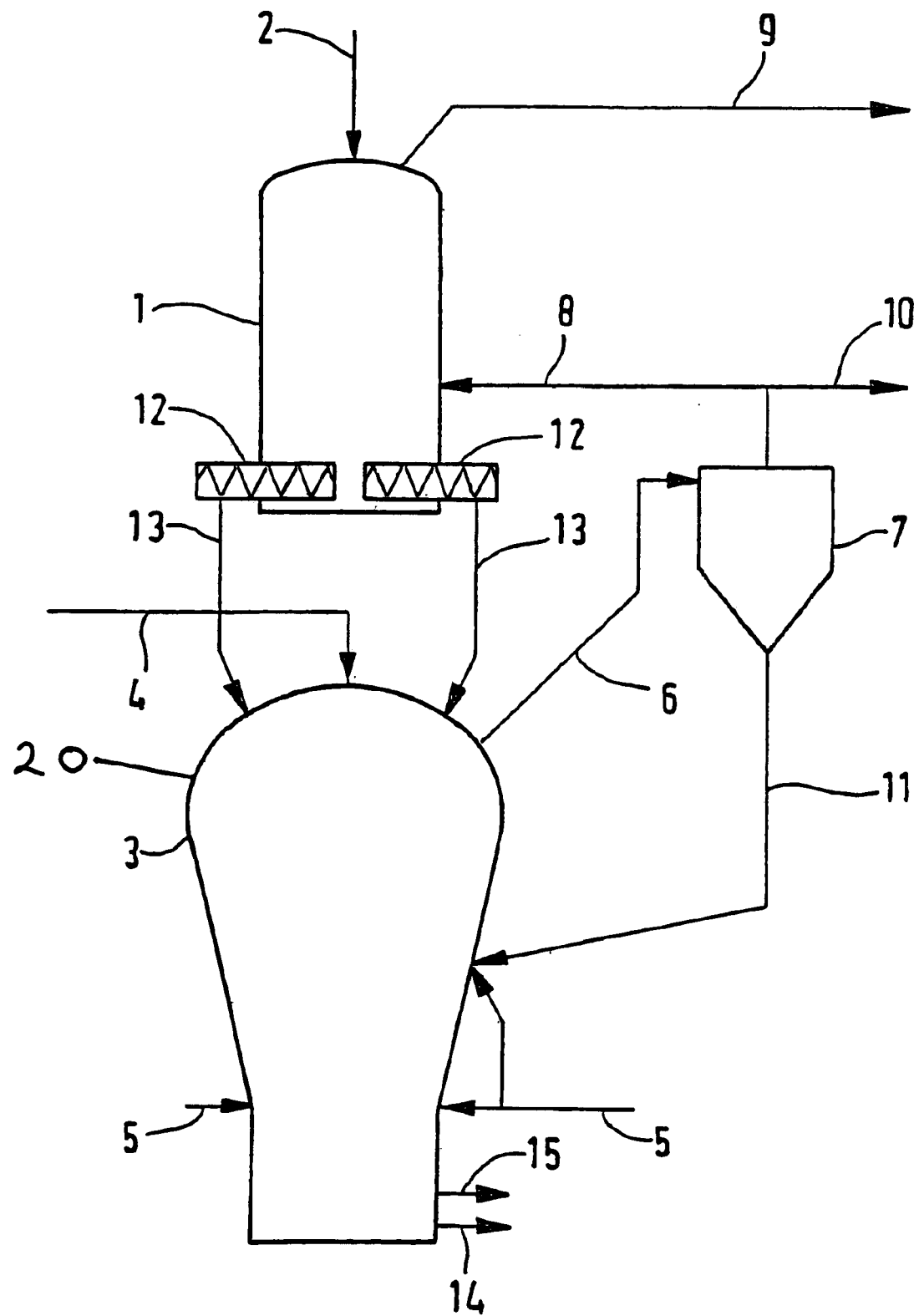

METHOD FOR PRODUCING PIG IRON

BACKGROUND OF THE INVENTION

The invention relates to a method for producing pig iron, in which iron ore is reduced to sponge iron in a reduction shaft and this sponge iron is then introduced into the head of a melting gasifier and melted there with the aid of a gasification agent.

In a plant for producing pig iron from iron ore, in which a reduction shaft and a melting gasifier are coupled to one another, during the charging of the melting gasifier with the reduced iron carriers and calcined loading materials only via the reduction shaft and with carbon carriers via the coal line, it is only possible in very few cases and for quite short periods of time to operate both units without their influencing one another in a negative manner. The two units are operationally connected to one another in such a way that normally the operation of the entire plant is shifted alternately for a period in favour of the reduction shaft and then for a period in favour of the melting gasifier. For a period of time, sufficient reduction gas is thus produced in the melting gasifier, by which means the reduction shaft is operated with a high specific amount of reduction gas and the iron carriers and loading materials, which are charged from the reduction shaft into the melting gasifier have a high degree of metallisation and calcination. Consequently, the energy requirement in the melting gasifier is lower, the temperatures of pig iron, slag and/or dome rise, the amount of oxygen is lessened and the amount of reduction gas produced in the melting gasifier becomes smaller. In turn, an inadequate amount of reduction gas for the reduction shaft results in a lower degree of metallisation and calcination of the charge introduced into the melting gasifier such that the energy requirement in the melting gasifier rises again, the temperature level in the melting gasifier drops, the specific amount of oxygen for the gasifier is increased and the new cycle begins again afresh with a higher input of energy. Only through the selection of raw materials which are matched to one another and by the early introduction of countermeasures is it possible to avoid the formation of such cycles with all their negative consequences such as pig iron which is too cold or too hot, fluctuations in the silicon, carbon and sulphur content of the pig iron, and the like. In order to produce usable pig iron continuously, the plant is operated with a much higher specific energy consumption and with a much greater fluctuation in the quality of the pig iron than would be the case if the two units were operationally uncoupled from one another.

OBJECT OF THE INVENTION

From this arises the object of the present invention which consists in operationally uncoupling the two units from one another and operating them without their influencing one another in a negative manner.

SUMMARY OF THE INVENTION

This object is accomplished according to the invention by having a high degree of metallisation of over 90% of the sponge iron introduced into the melting gasifier, and introducing iron oxide into the melting gasifier to reduce the degree of metallization. Additional developments of the method according to the invention are described hereinbelow.

Through the combined charging, matched to one another, of the melting gasifier with a well reduced sponge iron, i.e. one with a high degree of metallisation, from the reduction shaft, and with iron oxide preferably via the gasification agent line, there are supplied to the melting gasifier overall iron carriers with a controlled metallisation, which is relatively independent of the metallisation of the sponge iron alone, such that the operation of the melting gasifier is optimised. Through the direct introduction of the iron oxide via the head of the melting gasifier, additional oxygen is supplied to the latter and reacts with fine particles of gasification agent in the dome of the melting gasifier, exploiting the surplus amount of heat. In order to avoid a lack of carbon in the dome of the melting gasifier and to counteract the oxidation, by excess oxygen, of CO to form $CO_2$, in addition to iron oxide, gasification agent undersize is also supplied to the melting gasifier via the gasification agent line. Through a melting gasifier which is balanced in terms of energy and through an adequate amount of reduction gas for the reduction shaft, both units are thus operated without influencing one another.

A high and uniform metallisation of the sponge iron from the reduction shaft gives sufficient latitude for the latter to be adapted, through the addition of the iron oxide, to the excess energy in the upper region of the melting gasifier and to the quality of the raw materials, particularly of the gasification agent.

The degree of metallisation of the sponge iron from the reduction shaft should be maintained above 90%, preferably above 92%, and reduced by the addition of the iron oxide to roughly 88% or to an even lower value, if excess gas production is economically viable (e.g. for producing sponge iron or generating power). In this case, introducing gasification agent undersize and blowing increased amounts of oxygen into the dome of the melting gasifier makes sound technical and economic sense.

In order to be able to use all the iron oxide occurring during the sifting of the iron carriers and a portion of the gasification agent undersize, the degree of metallisation of the sponge iron from the reduction shaft and the amount of oxygen for the dome of the melting gasifier are correspondingly adapted.

The increased energy requirement for the reduction of the iron oxide undersize and the gasification of the gasification agent undersize in the upper region of the charge bed and in the dome region of the melting gasifier are covered by blowing increased amounts of oxygen into the dome of the melting gasifier.

Undersize containing carbon is supplied to the melting gasifier via the gasification agent line in order to cover the increased requirement for carbon carriers in the dome region of the melting gasifier and to prevent the combustion of CO into $CO_2$.

Through the additional input of oxygen in the form of iron oxide, volatile components of the gasification agent undersize and gaseous oxygen into the upper region of the melting gasifier, an adequate amount of reduction gas is produced in the melting gasifier, and thus the reduction shaft can be operated with a high and uniform specific amount of reduction gas, independently of the proportion of volatile constituents of the gasification agent.

By uncoupling the operation of the reduction shaft in this way from the operation of the melting gasifier what is achieved is that these two main units can be operated without influencing one another.

BRIEF DESCRIPTION OF THE DRAWINGS

The invention is explained in greater detail below with the aid of an embodiment reproduced in the FIGURE. The latter shows in schematic view a plant comprising essentially a reduction shaft and a melting gasifier for producing pig iron from iron ore.

DESCRIPTION OF THE PREFERRED EMBODIMENTS

Via a charging device 2, iron ore lumps, possibly with unburned loading materials, are charged into the reduction shaft 1 from above. The reduction shaft 1 communicates with the melting gasifier 3 in which a reduction gas is produced from a gasification agent, containing carbon and introduced via a delivery pipe 4, and from an oxygenous gas which is supplied via gas pipes 5. This reduction gas is led out of the head (or dome) 20 of the melting gasifier via a pipeline 6, freed in a hot gas cyclone 7 of solid constituents, especially coal dust and fine-grained coal, and then reaches the reduction shaft 1 via a pipeline 8. In this shaft, the reduction gas flows through the column of iron ore and loading materials in counterflow in relation to said column and in so doing reduces the iron ore to sponge iron. The at least partially spent reduction gas is drawn off at the upper end of the reduction shaft 1 via a top gas pipeline 9.

Reduction gas which is not required is supplied to a different application via a pipeline 10.

The coal dust deposited in the hot gas cyclone 7 is led back via a pipeline 11 by means of a transport gas, preferably nitrogen, to the melting gasifier 3 and, as it enters the latter, is gasified by dust-burners disposed in the wall of the melting gasifier 3 and to which oxygenous gas is also supplied.

Via delivery worms 12 and fall-pipes 13, the sponge iron produced in the reduction shaft 1 is introduced into the head of the melting gasifier 3.

At the base of the melting gasifier 3, liquid pig iron gathers and above it liquid slag, and these are intermittently drawn off respectively via a discharge aperture 14 or 15.

Before the gasification agent is introduced via the delivery pipeline 4 into the dome of the melting gasifier 3, iron oxide is mixed into the latter, preferably consisting of the sifted undersize of the iron ore before it is charged into the reduction shaft furnace. This could otherwise not be used for the reduction process. With direct use of the undersize in the melting gasifier 3, however, there are no negative effects on the process to be feared, if the undersize is only added in the amount necessary for operating reduction shaft 1 and melting gasifier 3 uncoupled from one another.

The gasification agent supplied via the delivery pipeline 4 includes undersize containing carbon in order to cover the increased requirement for carbon carriers for producing the reduction gas in the dome region of the melting gasifier 3 and to prevent combustion of CO into $CO_2$.

The introduction of oxygen in the form of iron oxide, volatile components of the gasification agent (coal) undersize and possibly additional gaseous oxygen into the upper region of the melting gasifier 3 takes place with the proviso that an adequate amount of reduction gas of constant composition, especially with a low $CO_2$ and $H_2O$ content and a maximum CO and $H_2$ content, and of a constant temperature is formed in order to be able to operate the reduction shaft 1 independently of the proportion of volatile constituents of the gasification agent and thus uncoupled from the operation of the melting gasifier 3.

The reduction gas is led into the reduction shaft 1 in such an amount that high metallisation of the sponge iron is achieved. This should be over 90%, if possible over 92%, on leaving the reduction shaft 1. The effective degree of metallisation, preferably 88% or below, is then set by correspondingly metered addition of the iron oxide via the delivery pipeline 4. It is also possible to nix the iron oxide with the sponge iron led out of the reduction shaft 1, before this mixture is introduced into the head of the melting gasifier 3. The level of effective metallisation is lowered by the addition of the iron oxide, in relation to the degree of metallisation of the sponge iron produced in the reduction shaft 1, insofar as it has to be possible to cover current energy shortfalls in the melting gasifier 3 by withdrawal of the iron oxide addition. Insofar as the energy shortfall in the melting gasifier 3 stems from a drop in the degree of metallisation of the sponge iron coming from the reduction shaft 1, as an alternative to or in addition to withdrawing the iron oxide addition, the specific rates of gasification agent or energy carrier can be increased. By this means additional reduction gas is made available to the reduction shaft, such that the metallisation is increased again.

What is claimed is:

1. A method for producing pig iron, in which iron ore is reduced to sponge iron in a reduction shaft and this sponge iron is then introduced into the head of a melting gasifier and melted there with the aid of a gasification agent, also introduced into the head of the melting gasifier, and an oxygenous gas to form liquid pig iron, there being simultaneously produced a reduction gas which is led away from the head of the melting gasifier and supplied to the reduction shaft to reduce the iron oxide, wherein the sponge iron introduced into the melting gasifier has a high degree of metallisation of over 90%, and iron oxide is introduced into the melting gasifier to reduce the degree of metallisation.

2. A method according to claim 1, wherein iron oxide lumps in the form of iron ore are used.

3. A method according to claim 1, wherein the iron oxide is introduced via a delivery pipeline for introducing the gasification agent.

4. A method according to claim 1, wherein the degree of metallisation of the sponge iron from the reduction shaft is over 92%.

5. A method according to claim 1, wherein through the addition of the iron oxide, the degree of metallisation of the iron oxide and the sponge iron introduced into the melting gasifier is reduced to about 88% or an even lower value.

6. A method according to claim 1, wherein at least a portion of the oxygenous gas is blown into the head region of the melting gasifier.

7. A method according to claim 1, wherein undersize containing carbon is supplied to the melting gasifier in the head region of the melting gasifier via a delivery pipeline for introducing the gasification agent.

8. A method according claim 1, wherein a mixture of iron oxide and sponge iron is charged into the melting gasifier.

9. A method according to claim 2, wherein iron oxide undersize is charged as the lumpy iron oxide carrier into the melting gasifier.

* * * * *